United States Patent
Park (10) Patent No.: US 9,830,693 B2
(45) Date of Patent: Nov. 28, 2017

(54) DISPLAY CONTROL APPARATUS, DISPLAY CONTROL METHOD, AND DISPLAY APPARATUS

(71) Applicant: Samsung Display Co., Ltd., Yongin (KR)

(72) Inventor: Jongwoong Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 128 days.

(21) Appl. No.: 14/616,030

(22) Filed: Feb. 6, 2015

(65) Prior Publication Data

US 2016/0042679 A1 Feb. 11, 2016

(30) Foreign Application Priority Data

Aug. 5, 2014 (KR) ........................ 10-2014-0100662

(51) Int. Cl.
*G06T 5/40* (2006.01)
*G06T 5/00* (2006.01)
*G09G 3/20* (2006.01)

(52) U.S. Cl.
CPC ................ *G06T 5/40* (2013.01); *G06T 5/009* (2013.01); *G09G 3/20* (2013.01); *G09G 2320/0673* (2013.01); *G09G 2360/16* (2013.01)

(58) Field of Classification Search
None
See application file for complete search history.

(56) References Cited

U.S. PATENT DOCUMENTS

| 6,507,668 B1* | 1/2003 | Park ........................ G06T 5/009 |
| | | 358/463 |
| 2006/0153446 A1* | 7/2006 | Oh .......................... G06T 5/009 |
| | | 382/169 |
| 2007/0047808 A1* | 3/2007 | Choe ....................... G06T 5/009 |
| | | 382/169 |
| 2010/0013847 A1 | 1/2010 | Shin |
| 2011/0050740 A1 | 3/2011 | Lee |
| 2012/0249514 A1 | 10/2012 | Ahn |
| 2012/0313914 A1 | 12/2012 | Matsumoto et al. |
| 2014/0104305 A1* | 4/2014 | Ryu ....................... G09G 3/3208 |
| | | 345/601 |
| 2014/0125688 A1* | 5/2014 | Chen ........................ G09G 5/02 |
| | | 345/589 |

FOREIGN PATENT DOCUMENTS

| KR | 1020040018878 | 3/2004 |
| KR | 1020080022851 | 3/2008 |
| KR | 1020110024451 | 3/2011 |
| KR | 1020110123952 | 11/2011 |
| KR | 1020120111675 | 10/2012 |
| WO | 2012027706 | 3/2012 |

* cited by examiner

*Primary Examiner* — David D Davis
(74) *Attorney, Agent, or Firm* — H.C. Park & Associates, PLC (57) ABSTRACT

A display control apparatus, including a histogram constructer configured to construct a histogram based on a gray value of each pixel of an input image signal, a maximum value determiner configured to determine a maximum value of an output image signal based on the input image signal, and a mapping curve determiner configured to determine a mapping curve for generating the output image signal from the input image signal, based on the histogram and the maximum value.

18 Claims, 8 Drawing Sheets

DISPLAY CONTROL APPARATUS, DISPLAY CONTROL METHOD, AND DISPLAY APPARATUS

CROSS-REFERENCE TO RELATED APPLICATION

This application claims priority from and the benefit of Korean Patent Application No. 10-2014-0100662, filed on Aug. 5, 2014, which is hereby incorporated by reference for all purposes as if fully set forth herein.

BACKGROUND

Field

Exemplary embodiments of the present invention relate to a display control apparatus, a display control method, and a display apparatus.

Discussion of the Background

An image processing technology may refer to a signal processing technology in which both an input and an output are image signals. The image processing technology may be used to remove noise, improve image quality, compress, or recover an image or a video file. The image processing technology may also generate an image that is more easily perceived by a user and reduce power consumption.

An output image signal generating technology using a mapping curve may be an image processing technology used in a display apparatus to processes an input image signal received from a broadcasting station, or the like, to generate an output image signal.

A conventional technology using a mapping curve may include analyzing an input image signal, increasing a conversion gradient in a gray area where a large number of pixels exist during conversion of an input image signal into an output image signal, and decreasing a conversion gradient in the gray area where a small number of pixels exist. Such technology may improve visibility of images and reduce power consumption.

However, such power saving effect may be greatly reduced for images having white backgrounds, which are widely used in a device such as a smartphone.

In addition, a large voltage drop may occur during the processing of images having white backgrounds. Accordingly, a luminance of the white background may vary depending on a location of the white background in the image.

Furthermore, a voltage drop may increase as more area of the image is occupied with the white background and as an average luminance of an output image signal increases. Accordingly, pixels that are designed to have the same luminance may have different luminance depending on the images.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display control apparatus for reducing power consumption and luminance difference between images by adjusting a maximum luminance of an output image signal generated using a mapping curve.

Exemplary embodiments of present invention also provide a display control apparatus for improving luminance consistency by adjusting a mapping curve according to locations of pixels on a display panel.

Additional aspects will be set forth in part in the description which follows and, in part, will be apparent from the disclosure, or may be learned by practice of the inventive concept.

An exemplary embodiment of the present invention provides a display control apparatus which may include a histogram constructer configured to construct a histogram based on a gray value of each pixel of an input image signal, a maximum value determiner configured to determine a maximum value of an output image signal based on the input image signal, and a mapping curve determiner configured to determine a mapping curve for generating the output image signal from the input image signal, based on the histogram and the maximum value.

An exemplary embodiment of the present invention also provides a display control method which may include constructing a histogram based on a gray value of each pixel of an input image signal, determining a maximum value of an output image signal based on the input image signal, and determining a mapping curve for generating the output image signal from the input image signal based on the histogram and the maximum value.

An exemplary embodiment of the present invention also provides a display apparatus which may include a display control apparatus configured to construct a histogram based on a gray value of each pixel of an input image signal, determine a maximum value of an output image signal based on the input image signal, determine a mapping curve for generating the output image signal from the input image signal based on the histogram and the maximum value, and output the output image signal from the input image signal based on the mapping curve. The display apparatus may further include a source driver configured to output a data voltage corresponding to the output image signal, and a display panel configured to receive the data voltage and display an image corresponding to the input image signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 1:
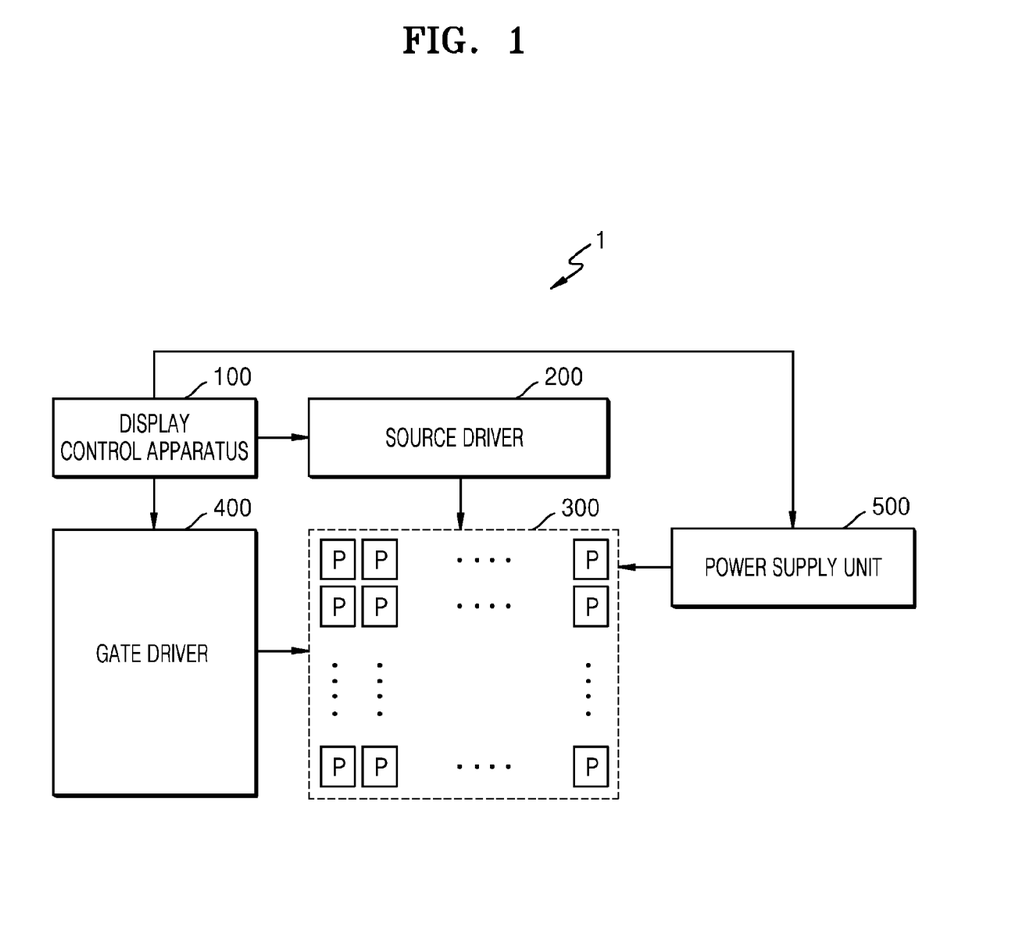
FIG. 1 is a block diagram illustrating a display apparatus according to an exemplary embodiment of the present invention.

FIG. 1 is a block diagram illustrating a display apparatus 1 according to an exemplary embodiment of the present invention.

Referring to FIG. 1, the display apparatus 1 may include a display control apparatus 100, a source driver 200, a display panel 300, a gate driver 400, and a power supply unit 500.

The display apparatus 1 may be a flat panel display apparatus such as an organic light-emitting diode (OLED), a thin-film transistor-liquid crystal display (TFT-LCD), a plasma display panel (PDP), or a light-emitting diode (LED). According to an exemplary embodiment of the present invention, the display apparatus 1 may be any apparatuses receiving an image signal and output an image corresponding to the received image signal. The display apparatus 1 may be an electronic apparatus itself such as a smartphone, a tablet PC, a laptop, a monitor, a TV, or may be a part of an electronic apparatus for displaying an image.

The display control apparatus 100 may receive an input image signal, analyze the input image signal, generate an output image signal, and transmit the output image signal. The display control apparatus 100 may transmit a control signal for controlling the source driver 200, the gate driver 400, and the power supply unit 500.

The term "input image signal" used herein refers to a signal that is received from the outside of the display apparatus 1. The input image signal may include information for generating an image of a visible area that may be perceived by a user's eyes through the display apparatus 1. The input image signal may be a digital signal or an analog signal. Hereinafter, exemplary embodiments of the present invention will be illustrated with respect to the digital input image signal.

The term "output image signal" used herein refers to a signal that is corrected from the input image signal. The output image signal may be obtained by applying an image processing technology to the input image signal. The output image signal may include information for generating an image of a visible area that may be perceived by the user's eyes through the display apparatus 1. The output image signal may be a digital signal or an analog signal. Hereinafter, exemplary embodiments of the present invention will be illustrated with respect to the digital output image signal.

A method of analyzing the input image signal and generating the output image signal by the display control apparatus 100 will be illustrated below with reference to FIG. 3 to FIG. 8.

The source driver 200 may receive the output image signal that is transmitted from the display control apparatus 100 and transmit a data voltage corresponding to the output image signal.

The display panel 300 may receive the data voltage and display an image corresponding to the data voltage. The display panel 300 may be a flat display panel such as an OLED panel or an LCD panel. Hereinafter, exemplary embodiments of the present invention will be illustrated with respect to the OLED display panel.

The display panel 300 may include pixels P. The pixels P may emit visible light corresponding to the data voltage.

The gate driver 400 may transmit a control signal to the display panel 300 to control the pixels P of the display panel 300. The power supply unit may supply power required to drive the display panel 300.

In FIG. 1, the display control apparatus 100, the source driver 200, the gate driver 400, and the power supply unit 500 are shown as separate blocks. However, the display control apparatus 100, the source driver 200, the gate driver 400, and the power supply unit 500 may be implemented as separate integrated circuits, or as one integrated circuit.

Figure 2:
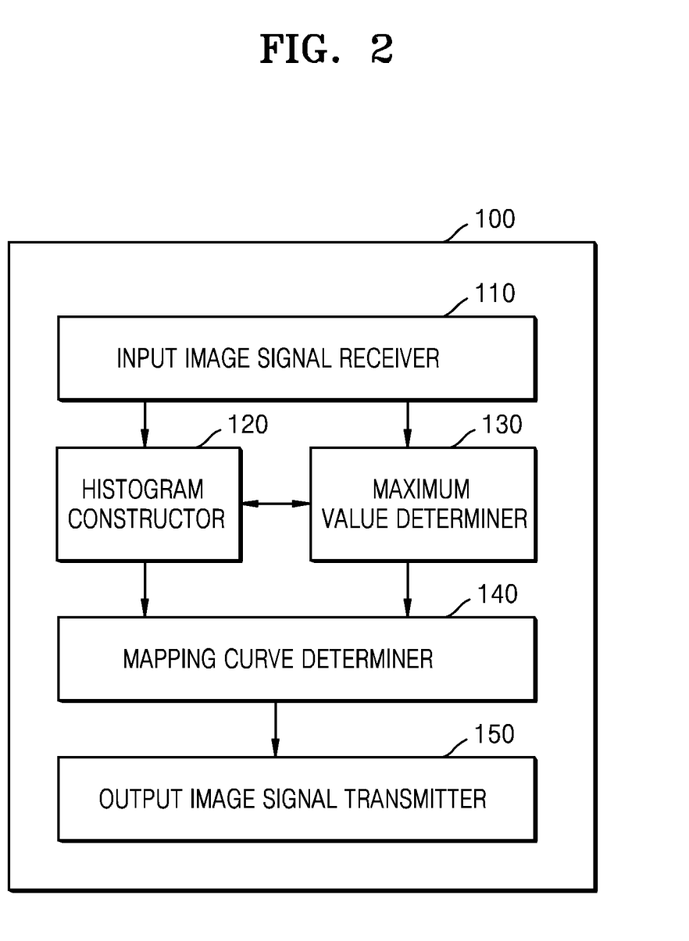
FIG. 2 is a block diagram illustrating a display control apparatus according to an exemplary embodiment of the present invention.

FIG. 2 is a block diagram illustrating the display control apparatus 100 according to an exemplary embodiment of the present invention.

Referring to FIG. 2, the display control apparatus 100 may include an input image signal receiver 110, a histogram constructor 120, a maximum value determiner 130, a mapping curve determiner 140, and an output image signal transmitter 150.

The input image signal receiver 110 may receive an input image signal from the outside of the display control apparatus 100.

The input image signal receiver 110 may include a regulator for regulating a voltage of the input image signal. The input image signal receiver 110 may include a noise reduction circuit for removing a noise signal included in the input image signal. The input image signal receiver 110 may further include a protective circuit to prevent a signal from flowing reversely.

The input image signal receiver 110 may be included in an integrated circuit for forming another element in the display control apparatus 100.

The histogram constructor 120 may construct a histogram based on a gray value of each pixel of the input image signal.

A method of calculating gray values of the pixels of the input image signal will be illustrated below with reference to FIG. 3.

The term "histogram" used herein refers to a graphical representation of data distribution. The histogram may be a bar chart classifying the data distribution into multiple classes and graphically displaying bars which represent the number of data distributed to each of the classes.

In the histogram constructed by the histogram constructor 120, the gray values of the pixels of the input image signal may be the data to be classified.

A range between a minimum gray value and a maximum gray value displayed by the display panel 300 may be divided into multiple gray sections. Thus, the multiple gray sections may be the multiple classes in the histogram of the histogram constructor 120.

A method of constructing the histogram by the histogram constructor 120 will be illustrated below with reference to FIG. 4.

The maximum value determiner 130 may determine a maximum value of an output image signal. The maximum value of the output image signal may be determined based on the input image signal.

A method of determining the maximum value by the maximum value determiner 130 will be illustrated below with reference to FIG. 5.

The mapping curve determiner 140 may determine a mapping curve for generating the output image signal from the input image signal based on the histogram and the maximum value of the output image signal.

A method of determining the mapping curve by the mapping curve determiner 140 will be illustrated below with reference to FIG. 5 to FIG. 8.

In FIG. 2, the histogram constructor 120, the maximum value determiner 130, and the mapping curve determiner 140 are shown as separate blocks. However, the histogram constructor 120, the maximum value determiner 130, and the mapping curve determiner 140 may be implemented as separate integrated circuits or as one integrated circuit.

The output image signal transmitter 150 may transmit the output image signal generated by the mapping curve determiner 140 to the display panel 300.

The output image signal transmitter 150 may include a regulator for regulating a voltage of the output image signal. The output image signal transmitter 150 may include a protective circuit to prevent a signal from flowing reversely.

The output image signal transmitter 150 may be included in an integrated circuit for forming another element included in the display control apparatus 100.

Figure 3:
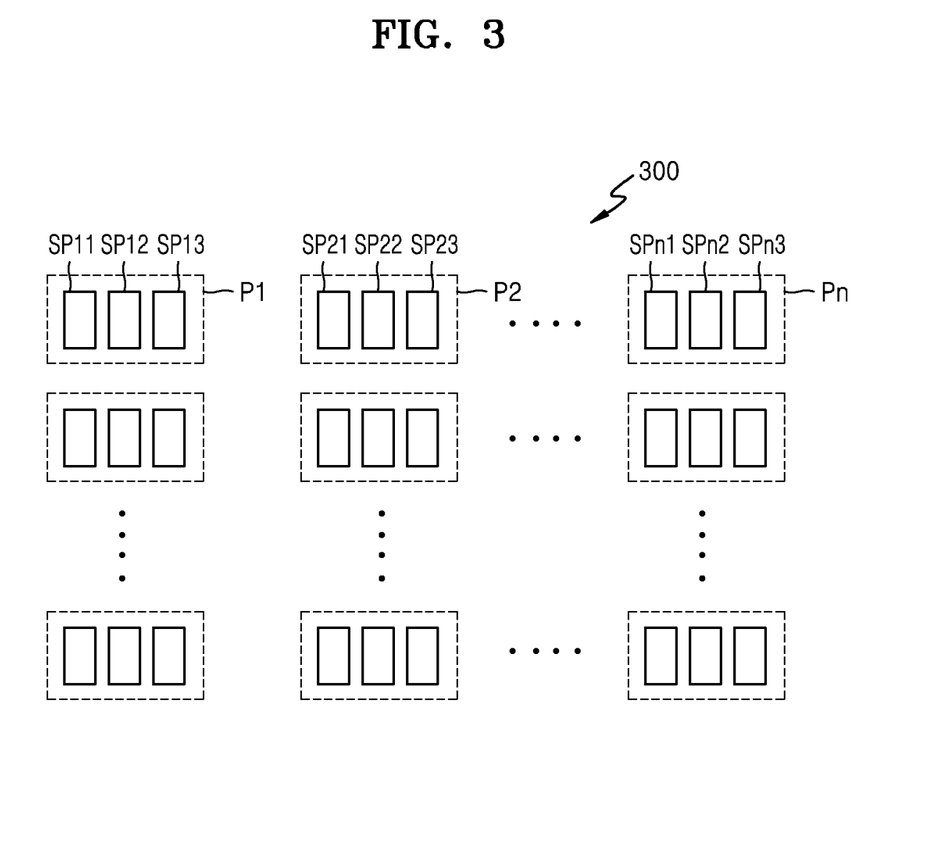
FIG. 3 is a diagram illustrating a display panel according to an exemplary embodiment of the present invention.

FIG. 3 is a diagram illustrating the display panel 300 according to an exemplary embodiment of the present invention.

Referring to FIG. 3, the pixels P included in the display panel 300 may include subpixels SP that may display different colors from each other. The term "pixel P" used herein may refer to one pixel P. However, the term "pixel P" may also refer to one subpixel SP. That is, when one pixel P is described, either one subpixel SP or one pixel P may exist.

The histogram constructor 120 may construct a histogram based on a gray value of each pixel P of an input image signal. The gray value of each pixel P may be obtained according to exemplary embodiments of the present invention.

In the present exemplary embodiment, the gray value of each pixel P may be obtained by using a weighted average of gray values of the subpixels SP of each pixel P. For example, the pixel P1 arranged at the top left corner of the display panel 300 includes three subpixels SP11, SP12, and SP13 having different colors. When a gray value of a pixel P is LP, a gray value LP1 of the pixel P1 may be obtained by using a weighted average of gray values of the subpixels LSP11, LSP12, and LSP13, as in Equation 1.

$$LP1 = (k1 \times LSP11) + (k2 \times LSP12) + (k3 \times LSP13) \quad \text{[Equation 1]}$$

Weighted values of subpixels k1, k2, and k3 of the display panel 300 may be determined based on the colors displayed by the subpixels SP. For example, a pixel P2 arranged next to P1 and a pixel Pn arranged at the top right corner of the display panel 300 may each include three subpixels having different colors. In addition, the three subpixels of the pixels P1, P2, and Pn have the same three colors arranged in the same order. That is, subpixels SP11, SP21, and SPn1 may have red colors, subpixels SP12, SP22, and SPn2 may have green colors, and subpixels SP13, SP23, and SPn3 may have blue colors. Thus, a gray value LP2 of the pixel P2 and a gray value LPn of the pixel Pn may be obtained according to Equation 2.

$$LP2=(k1{\times}LSP21)+(k2{\times}LSP22)+(k3{\times}LSP23) \quad \text{[Equation 2]}$$

$$LPn=(k1{\times}LSPn1)+(k2{\times}LSPn2)+(k3{\times}LSPn3)$$

The effects on luminance from different colors may vary from one another. Accordingly, a weighted value k may be determined based on the color displayed by each of the subpixels SP, and a gray value of each pixel P may be obtained by taking the effects on luminance from different colors into account.

A sum of all weighted values k may be 1. A gray value of each pixel P calculated in the present exemplary embodiment may express a correct brightness of the input image signal.

According to an exemplary embodiment of the present invention, a gray value of each pixel P may be obtained by using a maximum value among gray values of the subpixels LSP of each pixel P. For example, the gray value LP1 of the pixel P1 may be obtained by using Equation 3.

$$LP1=\max(LSP11,LSP12,LSP13) \quad \text{[Equation 3]}$$

The gray value LP1 may be calculated using Equation 3, and then an output value corresponding to the gray value LP1 may be calculated using a mapping curve. When an input gray value is LP and an output gray value is OLP, output gray values of the subpixels SP11, SP12, and SP13 may be obtained by using Equation 4.

$$OLSP11 = \frac{OLP1}{LP1} \times LSP11 \quad \text{[Equation 4]}$$
$$OLSP12 = \frac{OLP1}{LP1} \times LSP12$$
$$OLSP13 = \frac{OLP1}{LP1} \times LSP13$$

According to the present exemplary embodiment, since the gray value of each pixel P may be obtained without using a complicated equation that requires a large amount of computation, costs for obtaining a gray value LP of each pixel P may be reduced.

A gray value LP of each pixel P may be obtained by using various methods. Hereinafter, exemplary embodiments of the present invention will be illustrated based on the assumption that a gray value LP of each pixel P is calculated by using Equation 1.

Figure 4:
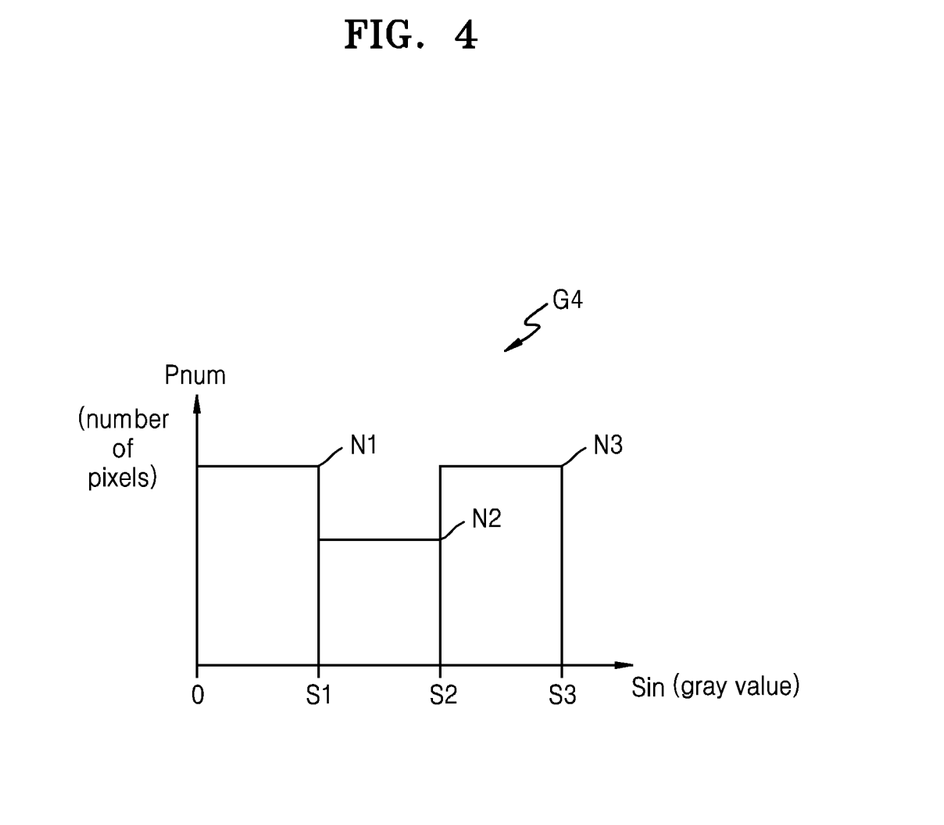
FIG. 4 is a diagram illustrating a method performed by the display control apparatus to construct a histogram of an input image signal, according to an exemplary embodiment of the present invention.

FIG. 4 is a diagram illustrating a method performed by the display control apparatus 100 to construct a histogram of an input image signal, according to an exemplary embodiment of the present invention.

Referring to FIG. 4, a graph G4 depicts the histogram of the input image signal. The horizontal axis represents gray sections of the input image signal, and the vertical axis represents the number of pixels P that are included in each of the gray sections.

The histogram of the graph G4 may include gray sections in which a gray value of each pixel P ranges from 0 to S1, S1 to S2, and S2 to S3. The gray value S3 may be a maximum gray value that the display panel 300 displays, and the gray value 0 may be a minimum gray value that the display panel 300 displays.

Referring to FIG. 4, the number of pixels P having gray values in the range from 0 to S1 is N1, the number of pixels P having gray values in the range from S1 to S2 is N2, and the number of pixels P having gray values in the range from S2 to S3 is N3. The total of N1, N2, and N3 may be the total number of pixels P in the display panel 300.

In FIG. 4, the total number of gray sections is 3. However, the total number of gray sections of the histogram based on a gray value of each pixel P of the input image signal may range from 2 to a number of gray values that the display panel 300 may display.

Figure 5:
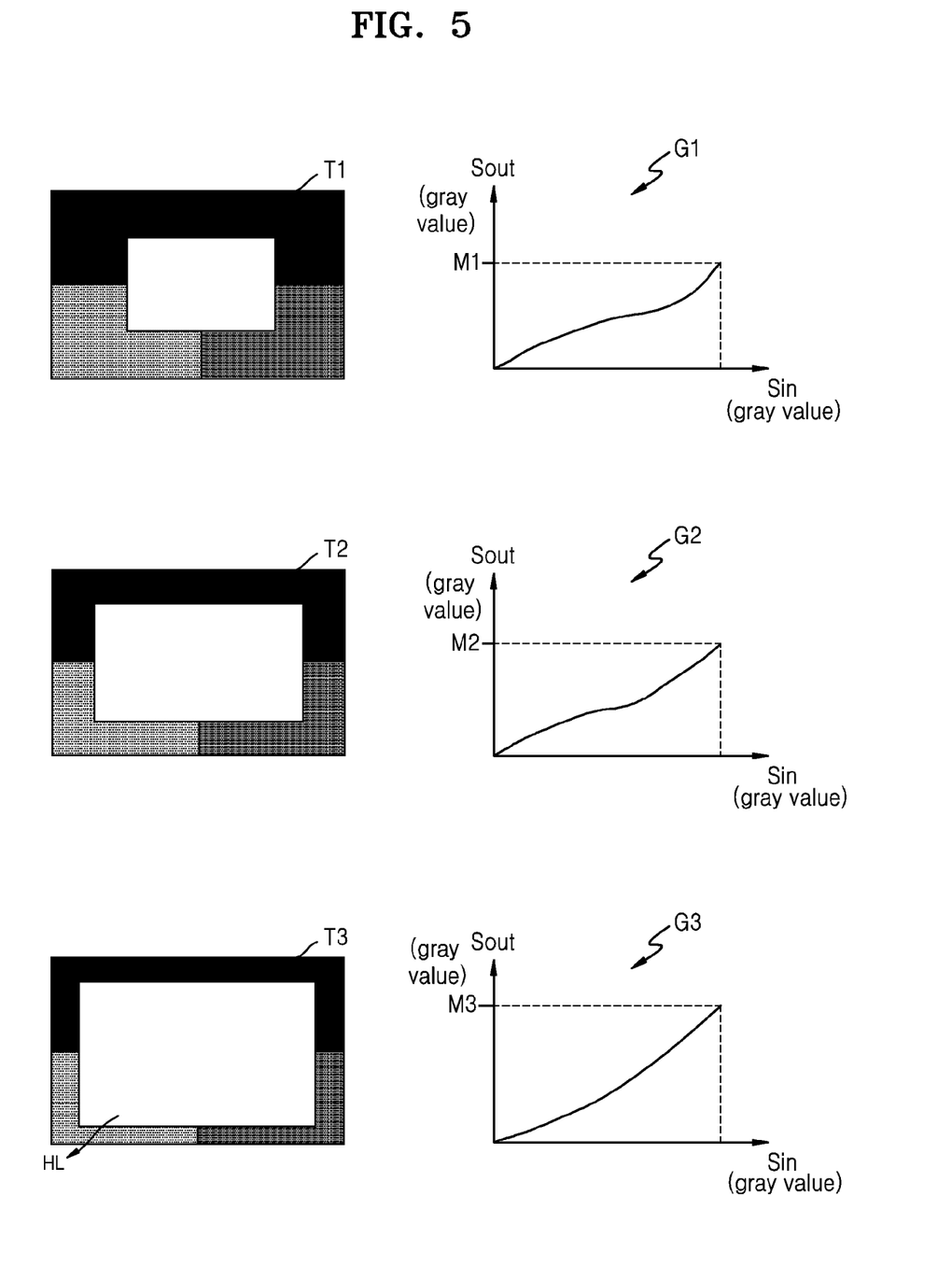
FIG. 5 is a diagram illustrating a method performed by the display control apparatus to determine a maximum value of an output image signal, according to an exemplary embodiment of the present invention.

FIG. 5 is a diagram for illustrating a method performed by the display control apparatus 100 to determine a maximum value of an output image signal, according to an exemplary embodiment of the present invention.

Referring to FIG. 5, when image information to be generated by an input image signal is as shown on a display panel T1, the maximum value of the output image signal based on the input image signal may be determined as M1, as shown in graph G1. When the image information to be generated by the input image signal is as shown on a display panel T2, the maximum value of the output image signal based on the input image signal may be determined as M2, as shown in graph G2. When the image information to be generated by the input image signal is as shown on a display panel T3, the maximum value of the output image signal based on the input image signal may be determined as M3, as shown in graph G3.

The maximum value determiner 130 may determine the maximum value of the output image signal based on the input image signal, according to the exemplary embodiments of the present invention.

In the present exemplary embodiment, the maximum value of the output image signal may increase as an average of gray values of all pixels of the input image signal increases. That is, when the number of pixels that are arranged in a horizontal direction of the display panel 300 is n, the number of pixels that are arranged in a vertical direction of the display panel 300 is m, and a gray value of a pixel disposed at an ith location in the horizontal direction and a jth location in the vertical direction is LP(i,j), a maximum value M of the output image signal may be calculated by using Equation 5.

$$M = \frac{1}{m \times n} \times \sum_{i=1}^{n} \sum_{j=1}^{m} LP(i,j) \quad \text{[Equation 5]}$$

When the maximum value of the output image signal is calculated using Equation 5, the maximum value of the output image signal may increase as the average of the gray values of all of the pixels of the input image signal increases. For example, referring to FIG. 5, a white area included in the display panel 300 is largest for an image formed in the display panel T3 and smallest in the display panel T1. Accordingly, the average value of the gray values of all of the pixels of the input image signal may be the highest in the image formed on the display panel T3 and lowest in the display panel T1. As a result, when maximum values of the output image signal obtained from the input image signal in the display panels T1, T2, and T3 are M1, M2, and M3, respectively, the following relationship between the maximum values M1, M2, and M3 is established.

$$M3 > M2 > M1 \quad \text{[Equation 6]}$$

A voltage drop may increase as the average value of the gray values of all of the pixels of the input image signal increases. Accordingly, when the maximum value of the output image signal may be increased as the average of the gray values of all of the pixels of the input image signal increases, a luminance drop from the voltage drop may be compensated. In addition, the output image signal with the same gray value may be displayed with the same luminance regardless of a luminance of the input image signal.

In an exemplary embodiment of the present invention, the maximum value of the output image signal may increase as the number of pixels having a highest gray value that the display panel 300 may display increases, among all of the pixels of the input image signal.

A voltage drop may increase as the number of high gray values increases in the input image signal. For example, in internet browsers used in smartphones, a white color which has the highest gray value that the display panel 300 may display is often displayed on the display panel 300. Accordingly, when the maximum value of the output image signal increases as the number of pixels having the highest gray value increases among all of the pixels of the input image signal, a luminance drop due to a voltage drop may be compensated for. Also, the output image signal with the same gray value may be displayed with the same luminance regardless of a luminance of the input image signal. Since the maximum value of the output image signal may be determined without using a complicated equation that requires a large amount of computation, costs for determining the maximum value of the output image signal may be reduced.

In an exemplary embodiment of the present invention, the maximum value of the output image signal may increase as a frequency of a gray section including the highest gray value that the input image signal may have increases. Accordingly, a luminance drop due to a voltage drop may be compensated more accurately than the exemplary embodiment which increases the maximum value of the output image signal as the number of pixels having the highest gray value that the display panel 300 may display increases among all of the pixels of the input image signal. In addition, as the present exemplary embodiment may require less computation than that of the exemplary embodiment using the average value of the gray values of all of the pixels of the input image signal, costs involved in the computation may be reduced.

Figure 6:
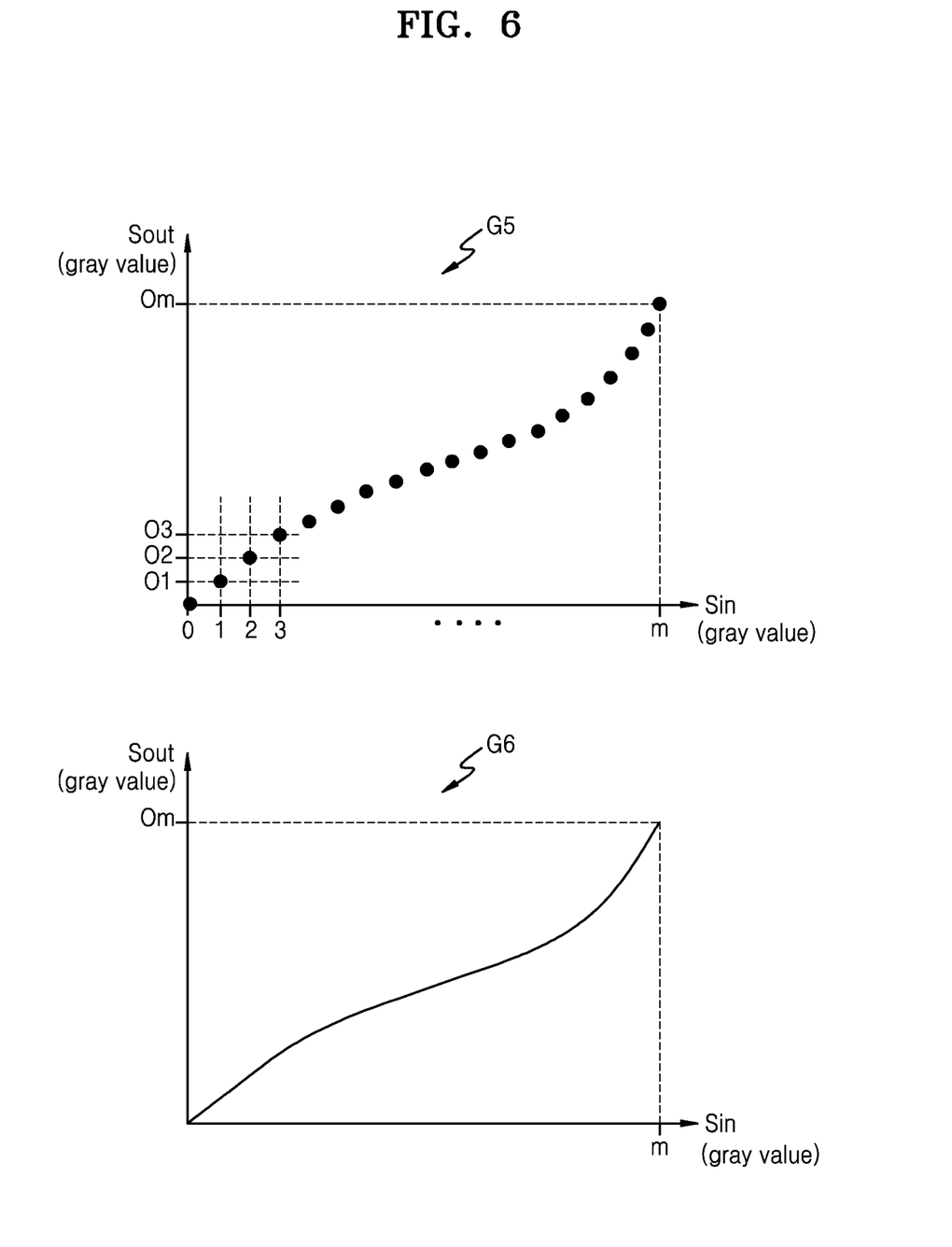
FIG. 6 is a diagram illustrating a method performed by the display control apparatus to determine a mapping curve, according to an exemplary embodiment of the present invention.

FIG. 6 is a diagram illustrating a method performed by the display control apparatus 100 to determine a mapping curve, according to an exemplary embodiment of the present invention.

Referring to FIG. 6, a mapping curve may be obtained from a graph of a one-to-one correspondence as shown in a graph G5. The horizontal axis represents a gray value of an input image signal, and the vertical axis represents a gray value of an output image signal. In graph G5, points of the graph of the one-to-one correspondence may be connected according to a gray order of the input image signal. Accordingly, a graph with a broken line graph may be obtained. When the broken line graph is expressed as a smooth curve without vertices, a mapping curve as shown in a graph G6 may be obtained. A method of obtaining a smooth curve without vertices from a broken line graph may be one of various image processing technologies. A gradient of a gray value from a specific input image signal may be obtained from the mapping curve.

Figure 7:
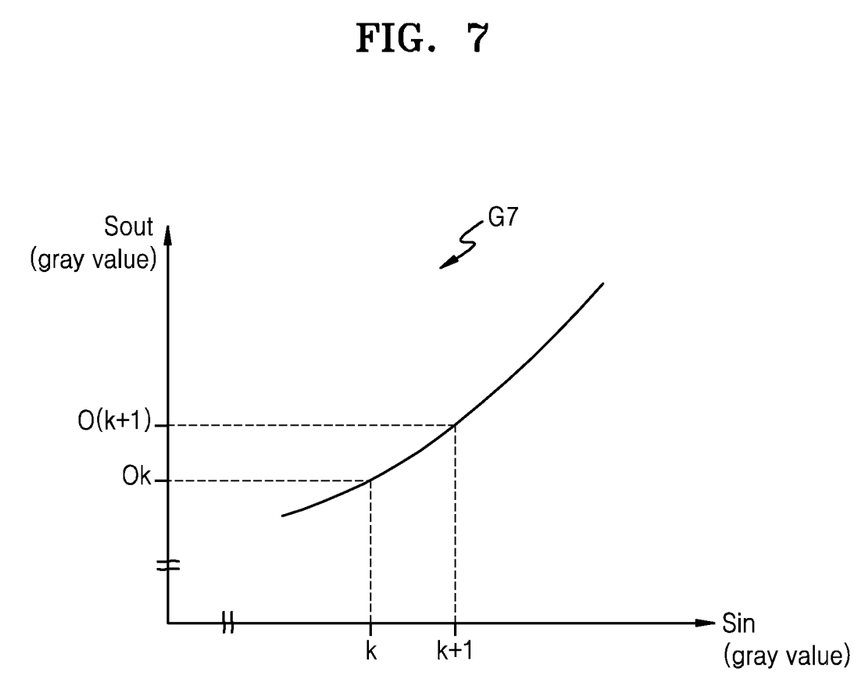
FIG. 7 is a diagram illustrating a method performed by the display control apparatus to determine a mapping curve, according to an exemplary embodiment of the present invention.

FIG. 7 is a diagram for illustrating a method performed by the display control apparatus 100 to determine a mapping curve, according an exemplary embodiment of the present invention.

Referring to FIG. 7, a gray value of an output image signal that is mapped to a gray value k of an input image signal is denoted as Ok, and a gray value of the output image signal that is mapped to a gray value k+1 of the input image signal is denoted as O(k+1).

The mapping curve determiner 140 may determine the mapping curve so that a gray value of the output image signal may be mapped to a corresponding gray value of the input image signal, based on a frequency of each gray section of a histogram.

For example, a first gray section may have a range of a gray value from k to less than k+p. In this case, the mapping curve determiner 140 may determine the mapping curve so that a difference between the gray value Ok of the output image signal mapped to the gray value k of the input image signal and a gray value O(k+p) of the output image signal mapped to the gray value k+p of the input image signal may increase as a frequency of the first gray section increases.

When the mapping curve is determined according to the present exemplary embodiment, as the number of pixels having a gray value ranging from k to less than k+p in the input image signal increases, the input image signal of the corresponding gray section may be mapped to a gray value of the output image signal with a relatively large interval. In contrast, as the number of pixels having a gray value ranging from k to less than k+p in the input image signal decreases, the input image signals of the corresponding gray section may be mapped to a gray value of the output image signal with a relatively small interval.

Accordingly, pixels of a gray section having large frequency in the input image signal may be displayed on the display panel 300 with a greater gray value difference, thereby improving visibility of an output image.

According to an exemplary embodiment of the present invention, the mapping curve determiner 140 may determine the mapping curve so that a gradient difference between the adjacent gray values of the input image signal of the mapping curve may be equal to or less than a first value N1.

For example, when a gradient at a gray value k of the input image signal is Gk and a gradient at a gray value k+1 of the input image signal is G(k+1), the mapping curve determiner 140 may determine the mapping curve so that a difference between the gradient Gk and the gradient G(k+1) may be equal to or less than the first value N1. When the total number of gray values that the display panel 300 may display is M, the first value N1 may be obtained by using Equation 7.

$$N1 = \frac{1}{M} \quad \text{[Equation 7]}$$

The first value N1 is a value that may not cause a user to realize drastic change in the gradient. The first value N1 may be set by using various equations. By maintaining the gradient difference between two adjacent gray values of the input image signal of the mapping curve equal to or less than a predetermined value, it may be possible to prevent a false contour from being undesirably created on an image displayed through the display panel 300.

Figure 8:
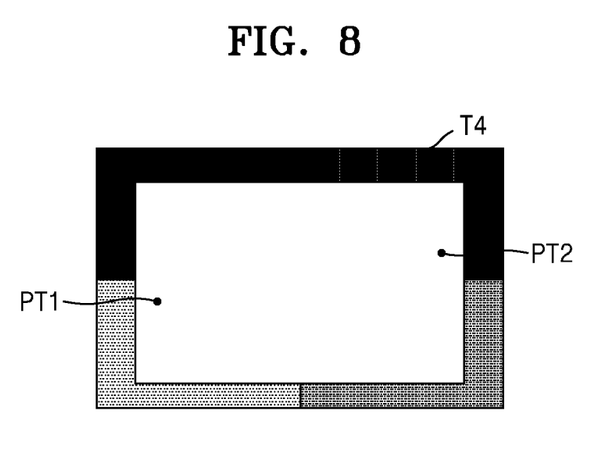
FIG. 8 is a diagram illustrating a method of determining luminance of pixels that exist at different positions of a display panel, according to an exemplary embodiment of the present invention.

FIG. 8 is a diagram for illustrating a method of determining luminance of pixels that exist at different locations of the display panel 300, according to an exemplary embodiment of the present invention.

Pixels that are disposed at different locations of the display panel 300 may be affected differently by a voltage drop. For example, a pixel at a location PT1 and a pixel at a location PT2 are differently affected by a voltage drop. Accordingly, when an input image signal having the same gray value is applied to the pixel at the location PT1 and the pixel at the location PT2, and is mapped to have an output image signal of the same gray level, luminance for corresponding locations in the display panel 300 may be different from each other.

Accordingly, in determining a mapping curve for generating the output image signal from the input image signal, the mapping curve determiner 140 may additionally take an effect of a voltage drop based on a location of each pixel into account. For example, when the number of pixels that are arranged in a horizontal direction of the display panel 300 is n, the number of pixels that are arranged in a vertical direction is m, and a pixel that is disposed at an ith location in the horizontal direction and a jth location in the vertical direction, an output gray value of the pixel that is calculated without considering a location of the pixel is OLP1, an output gray value MOLP1 of the pixel that is calculated considering the location of the pixel may be obtained by using Equation 8.

$$MOLP1 = a(i,j) * OLP1 \quad \text{[Equation 8]}$$

In Equation 8, $a(i,j)$ denotes the amount of a voltage drop occurred at the location of the pixel. That is, an output gray value of a pixel at a location where the amount of a voltage drop is relatively large may be determined to be relatively high, and an output gray value of a pixel at a location where the amount of a voltage drop is relatively small may be determined to be relatively low. Accordingly, when an input image signal having the same gray value is applied, pixels that exist at different locations of the display panel 300 may output same luminance through the display panel 300.

Figure 9:
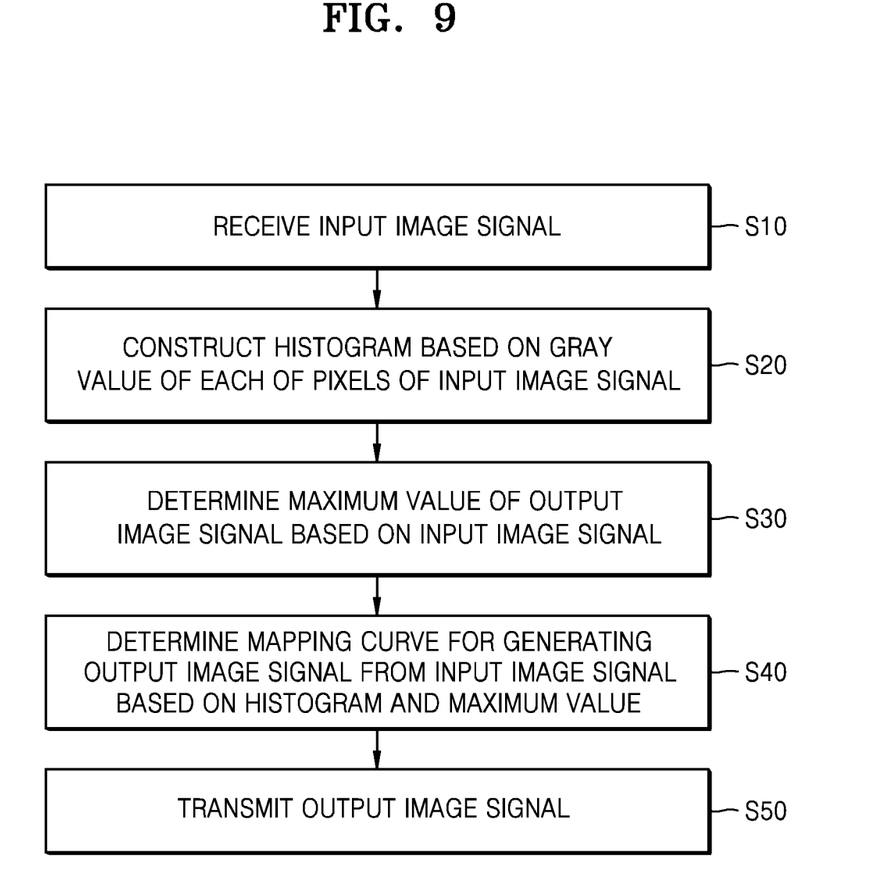
FIG. 9 is a flowchart illustrating a display control method according to an exemplary embodiment of the present invention.

FIG. 9 is a flowchart illustrating a display control method according to an exemplary embodiment of the present invention.

Repeated description of the substantially similar elements and operations illustrated with reference to FIG. 1 through FIG. 8 will be omitted.

Referring to FIG. 9, in operation S10, the display control apparatus 100 may receive an input image signal.

Next, in operation S20, in response to receiving the input image signal, the display control apparatus 100 may construct a histogram based on a gray value of each of pixels of the input image signal.

Next, in operation S30, the display control apparatus 100 may determine a maximum value of an output image signal based on the input image signal. In determining the maximum value of the output image signal by the display control apparatus 100, the histogram constructed in operation S20 may be used.

Next, in operation S40, the display control apparatus 100 may determine a mapping curve for generating the output image signal from the input image signal, based on the histogram and the maximum value of the output image signal.

Next, in operation S50, the display control apparatus 100 may transmit the output image signal generated by using the determined mapping curve.

A display control apparatus and a display control method according to the exemplary embodiments of the present invention may reduce power consumption of a display apparatus and reduce a luminance difference between pixels that exist in different frames by adjusting a maximum luminance of an output image signal based on an input image signal.

The display control apparatus and the display control method according to the exemplary embodiments of the present invention may reduce a luminance difference between pixels that exist at different locations in the same frame by varying a mapping curve according to a location of each of pixels on a display panel.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display control apparatus configured to receive an input image signal and output an output image signal, comprising:
   a histogram constructer configured to construct a histogram based on a gray value of each pixel of the input image signal;
   a maximum value determiner configured to determine a maximum value of the output image signal based on the input image signal; and
   a mapping curve determiner configured to receive the input image signal and determine a mapping curve for generating the output image signal from the input image signal, based on the histogram and the maximum value,
   wherein:
   the histogram constructer, the maximum value determiner, and the mapping curve determiner are each formed as an integrated circuit; and
   the maximum value is configured to be increased as a number of pixels having a highest gray value that the input image signal may have from among the pixels of the input image signal increases.

2. The display control apparatus of claim 1, wherein the gray value of each pixel is based on:
   a weighted average of gray values of subpixels of each pixel; or
   a maximum gray value of the subpixels of each pixel.

3. The display control apparatus of claim 2, wherein the weighted average is calculated by using weighted values that are respectively based on types of the subpixels.

4. The display control apparatus of claim 1, wherein:
   a gray range of the input image signal is divided into gray sections; and
   a frequency of each gray section of the histogram represents a number of pixels having the gray value within each gray section.

5. The display control apparatus of claim 4, wherein the maximum value increases as the frequency of the gray section comprising the highest gray value that the input image signal may have from among the gray sections increases.

6. The display control apparatus of claim 4, wherein the mapping curve is configured to map a gray value of the output image signal corresponding to the gray value of the input image signal based on the frequency of each gray section of the histogram.

7. The display control apparatus of claim 6, wherein:
a first gray section of the histogram comprises a gray value equal to or greater than a first gray value and less than a second gray value; and
the mapping curve is configured to increase a difference between a gray value of the output image signal mapped to the first gray value of the input image signal and a gray value of the output image signal mapped to the second gray value of the input image signal, as a frequency of the first gray section increases.

8. The display control apparatus of claim 1, wherein a gradient difference between two adjacent gray values of the input image signal of the mapping curve is equal to or less than a first value.

9. The display control apparatus of claim 1, wherein the mapping curve is configured to map a gray value of the output image signal corresponding to the gray value of the input image signal based on a location of each pixel.

10. A display control method for outputting an output image signal in response to receiving an input image signal, the method comprising:
constructing a histogram based on a gray value of each pixel of the input image signal;
determining a maximum value of the output image signal based on the input image signal; and
determining a mapping curve for generating the output image signal from the input image signal based on the histogram and the maximum value,
wherein:
the histogram constructer, the maximum value determiner, and the mapping curve determiner are each formed as an integrated circuit; and
a gradient difference between two adjacent gray values of the input image signal of the mapping curve is equal to or less than a first value.

11. The display control method of claim 10, wherein the gray value of each pixel is based on:
a weighted average of gray values of subpixels of each pixel; or
a maximum gray value of the subpixels of each pixel, the weighted average is calculated by using weighted values that are respectively based on types of the subpixels.

12. The display control method of claim 10, wherein the maximum value of the output image signal increases as an average value of gray values of the pixels of the input image signal increases.

13. The display control method of claim 10, wherein the maximum value of the output image signal increases as a number of pixels having a highest gray value that the input image signal may have increases from among the pixels of the input image signal increases.

14. The display control method of claim 10, wherein:
a gray range of the input image signal is divided into gray sections; and
a frequency of each gray section of the histogram represents a number of pixels having the gray value within each gray section.

15. The display control method of claim 14, wherein the maximum value of the output image signal increases as a frequency of a gray section comprising a highest gray value that the input image signal may have from among the gray sections increases.

16. The display control method of claim 14, wherein the mapping curve is configured to map a gray value of the output image signal corresponding to the gray value of the input image signal based on a frequency of each gray section of the histogram.

17. The display control method of claim 10, wherein the mapping curve is configured to map a gray value of the output image signal corresponding to the gray value of the input image signal based on a location of each pixel.

18. A display apparatus, comprising:
a display control apparatus, configured to:
receive an input image signal;
construct a histogram based on a gray value of each pixel of the input image signal;
determine a maximum value of an output image signal based on the input image signal;
determine a mapping curve for generating the output image signal from the input image signal based on the histogram and the maximum value; and
output the output image signal from the input image signal based on the mapping curve;
a source driver configured to output a data voltage corresponding to the output image signal; and
a display panel configured to receive the data voltage and display an image corresponding to the input image signal,
wherein:
the histogram constructer, the maximum value determiner, and the mapping curve determiner are each formed as an integrated circuit; and
the mapping curve is configured to map a gray value of the output image signal corresponding to a gray value of the input image signal based on a location of each pixel.

* * * * *